US010028440B2

(12) United States Patent
Neudorf et al.

(10) Patent No.: US 10,028,440 B2
(45) Date of Patent: Jul. 24, 2018

(54) BALE TURNING APPARATUS FOR A BALE PROCESSOR

(71) Applicant: Highline Manufacturing Limited, Vonda (CA)

(72) Inventors: Blake Neudorf, Vonda (SK); Montgomerie Summach, Vonda (CA); Joel Dokken, Vonda (CA); Gene Kondra, Vonda (CA)

(73) Assignee: Highline Manufacturing Limited, Vonda (CA)

( * ) Notice: Subject to any disclaimer, the term of this patent is extended or adjusted under 35 U.S.C. 154(b) by 0 days.

(21) Appl. No.: 15/147,385

(22) Filed: May 5, 2016

(65) Prior Publication Data

US 2017/0231160 A1    Aug. 17, 2017

(30) Foreign Application Priority Data

Feb. 11, 2016    (CA) ...................................... 2920470

(51) Int. Cl.
| | |
|---|---|
| *B66F 11/00* | (2006.01) |
| *A01D 90/04* | (2006.01) |
| *A01D 87/12* | (2006.01) |
| *A01F 29/00* | (2006.01) |
| *A01F 29/10* | (2006.01) |

(52) U.S. Cl.
CPC ........... *A01D 90/04* (2013.01); *A01D 87/122* (2013.01); *A01F 29/005* (2013.01); *A01F 29/10* (2013.01)

(58) Field of Classification Search
CPC ..... A01D 90/04; A01D 87/122; A01F 29/005; A01F 29/10

USPC ....................................................... 414/111, 24
See application file for complete search history.

(56) References Cited

U.S. PATENT DOCUMENTS

| | | | | |
|---|---|---|---|---|
| 3,945,507 | A * | 3/1976 | Olsen ..................... | A01D 90/08 414/789.4 |
| 4,091,943 | A * | 5/1978 | Bay-Schmith ......... | A01D 90/08 414/555 |
| 4,203,695 | A * | 5/1980 | Wynn .................... | A01D 90/08 414/789.4 |
| 4,428,706 | A * | 1/1984 | Butler .................. | A01D 90/083 414/24.5 |
| 4,459,075 | A * | 7/1984 | Eichenberger ....... | A01D 90/083 414/24.5 |
| 4,636,131 | A * | 1/1987 | Sinclair .................. | B66F 9/147 414/607 |

(Continued)

*Primary Examiner* — Rakesh Kumar
(74) *Attorney, Agent, or Firm* — Michael A. Bondi; Moss & Barnett

(57) ABSTRACT

A bale processor apparatus has a bale processing chamber mounted on a chamber frame on wheels for travel in a travel direction. A lift arm frame is pivotally attached to a rear end of the chamber frame about a lift pivot axis, and a lift actuator pivots the lift arm frame from a lowered position to a raised position. A bale turning assembly is pivotally attached to the lift arm frame and bale fork tines are attached to the bale turning assembly. A turning actuator pivots the bale turning assembly from a standard position, where the bale fork tines extend rearward from bale processing chamber to a turned position, where the bale fork tines are rearward of the bale processing chamber and perpendicular to the travel direction. A shear bar cuts twine on rectangular bales as they fall into the chamber but does not affect cylindrical bales.

18 Claims, 3 Drawing Sheets

(56) References Cited

U.S. PATENT DOCUMENTS

| | | | |
|---|---|---|---|
| 4,844,675 A * | 7/1989 | Strosser | A01D 85/005 280/656 |
| 4,952,111 A * | 8/1990 | Callahan | A01D 90/083 414/111 |
| 5,033,683 A | 7/1991 | Taylor | |
| 5,340,040 A | 8/1994 | Bussiere | |
| 5,547,334 A * | 8/1996 | Baril | A01D 90/08 414/789.7 |
| 5,720,589 A * | 2/1998 | Christenson | B65F 3/00 414/408 |
| 5,895,001 A | 4/1999 | Kuelker | |
| 5,899,652 A * | 5/1999 | Graham | A01D 90/083 414/24.5 |
| 6,019,562 A * | 2/2000 | Cheatham | A01D 90/083 414/111 |
| 6,048,160 A * | 4/2000 | Reist | A01D 85/005 414/111 |
| 6,095,744 A * | 8/2000 | Harrison | B65F 3/046 294/111 |
| 6,350,098 B1 * | 2/2002 | Christenson | B65F 3/00 414/408 |
| 6,514,029 B2 * | 2/2003 | Millsap | A01D 90/08 414/24.5 |
| 6,997,663 B2 * | 2/2006 | Siebenga | A01D 85/005 414/111 |
| 7,156,333 B2 | 1/2007 | Lepage | |
| 7,347,659 B2 * | 3/2008 | Maclay | A01D 87/122 414/24.5 |
| 7,419,345 B2 * | 9/2008 | Priepke | A01D 85/005 414/24.5 |
| 7,651,043 B2 * | 1/2010 | Hoovestol | A01F 29/005 241/189.1 |
| 8,112,202 B2 * | 2/2012 | Fackler | A01D 90/08 56/474 |
| 8,306,703 B1 * | 11/2012 | Saleh | B66F 9/07581 187/222 |
| 9,296,597 B1 * | 3/2016 | Cannon | B66F 9/183 |
| 9,370,140 B2 * | 6/2016 | Sudbrack | B60P 1/48 |
| 2001/0038790 A1 * | 11/2001 | Evans | A01D 87/003 414/740 |
| 2002/0146311 A1 * | 10/2002 | Millsap | A01D 90/08 414/789.7 |
| 2005/0220571 A1 * | 10/2005 | Ackerman | A01D 90/08 414/24.5 |
| 2005/0226709 A1 * | 10/2005 | Koster | A01D 90/08 414/501 |
| 2005/0288841 A1 * | 12/2005 | Fackler | A01D 85/005 701/50 |
| 2006/0175445 A1 * | 8/2006 | Hoovestol | A01D 90/08 241/101.74 |
| 2008/0267740 A1 * | 10/2008 | Anderson | A01D 85/005 414/111 |
| 2010/0299029 A1 * | 11/2010 | Fackler | A01D 90/08 701/50 |
| 2015/0289449 A1 * | 10/2015 | Greer | A01D 90/083 414/24.5 |

* cited by examiner

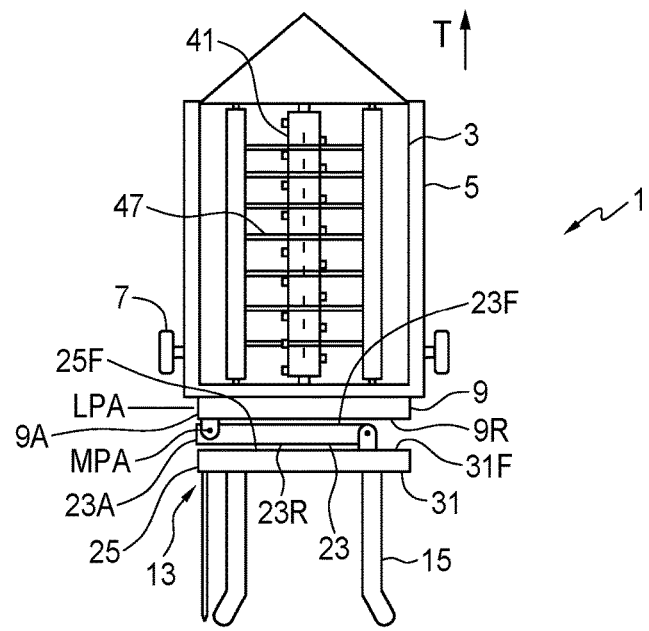
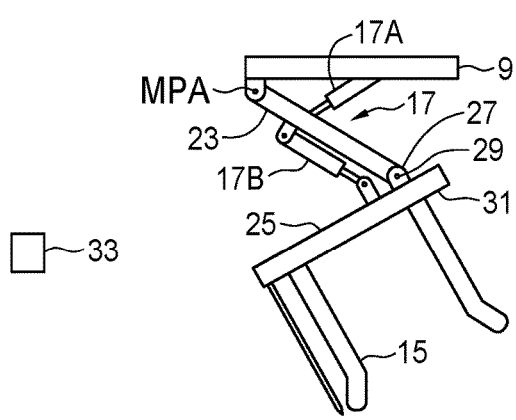
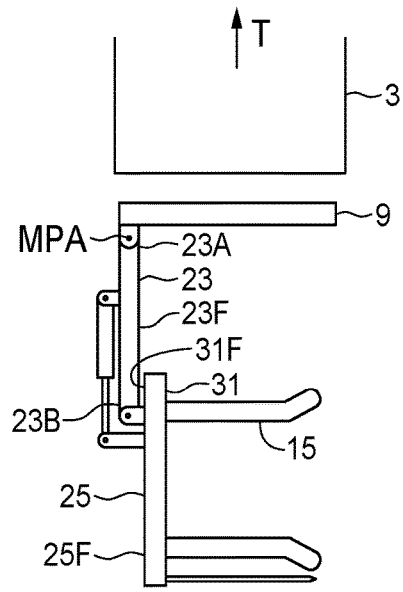
FIG. 1
FIG. 2
FIG. 3

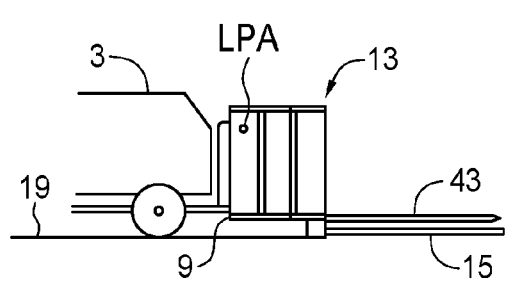
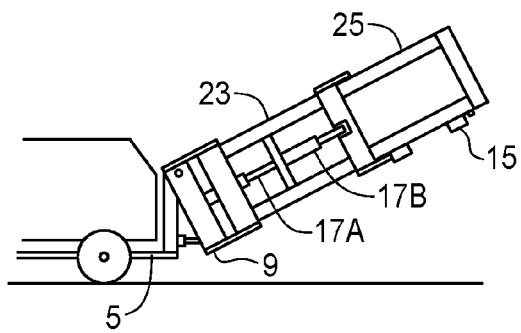
FIG. 4　　　　FIG. 5
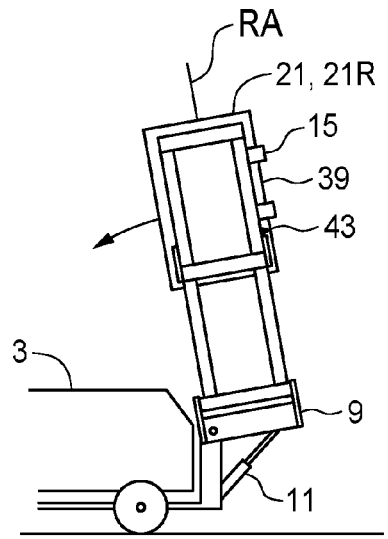
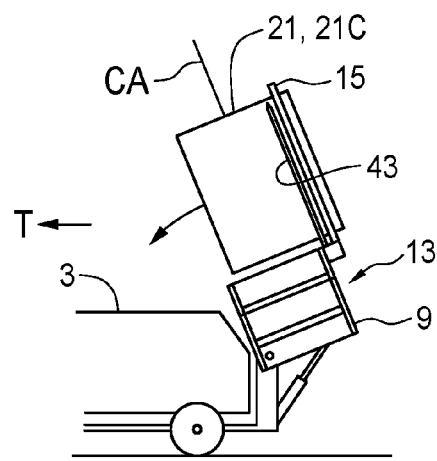
FIG. 6　　　　FIG. 7
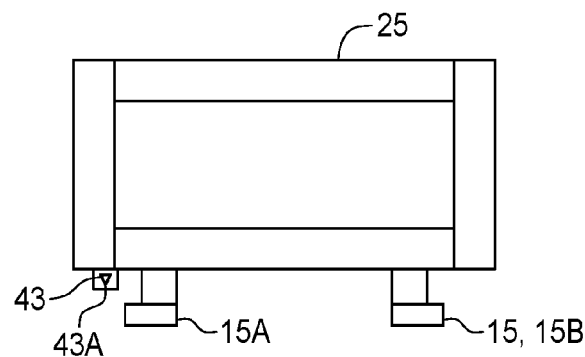
FIG. 8

BALE TURNING APPARATUS FOR A BALE PROCESSOR

FIELD OF THE INVENTION

This disclosure relates to the field of agricultural implements and in particular a bale processor for loading and disintegrating large round or square bales of crop material.

BACKGROUND OF THE INVENTION

Crop material such as hay, straw and the like is commonly harvested by compacting the material into bales tied with twine. These bales can be small square bales that can be handled by hand, but more commonly now they are large bales that can weigh up to 2000 pounds. These large bales can be rectangular, essentially an elongated cube and typically called "square bales", or cylindrical, typically called "round" bales, and when feeding such bales it is common to use a bale processor to remove shredded crop material from the bale with a disintegrator or flail apparatus and then and discharge the shredded material onto the ground or into a feed bunk. Such a bale processor is disclosed for example in U.S. Pat. No. 5,340,040 to Bussiere et al. and U.S. Pat. No. 5,033,683 to Taylor.

Typical bale processors include a container where one or more bales are placed, and a shredding mechanism operative to shred the bale and discharge the shredded crop material in a stream from the bale processor. In one style of bale processor the bottom deck of the container is a floor with conveyor slats moving along the floor to move the bale toward a disintegrator rotor located on one side of the container. In another popular style, the bottom deck of the container is provided typically by rotating drums that are operative to rotate the bale while it is resting on the bottom deck, and spaced apart guard rods oriented perpendicular to the feed rollers. The bale rests on the guard rods and drums and the flail elements on the disintegrator rotor extend up between the bars to tear pieces of crop material off the bale as it rotates.

Large bales can be loaded into the container with a loader vehicle, but it is common to also provide a bale loading fork apparatus at the rear end of the bale processor. The fork apparatus is configured to allow the operator to lower the forks to extend horizontally from the rear of the bale processor and back the bale processor up such that the forks slide under a bale resting on the ground. The operator can then raise the forks with the bale resting on them, and tilt the rear end of the forks upward such that the bale falls into the container.

Such a fork apparatus is disclosed for example in U.S. Pat. No. 5,895,001 to Kuelker et al. and U.S. Pat. No. 7,156,333 to Lepage et al. Often the bales are stored at some distance from where it is desired to spread them. The forks allow the operator to carry bales in the container and also carry one or more bales on the forks so that a plurality of bales can be processed on each trip from a storage location to a use location.

Loading large square bales is difficult when approaching from the end as only a small target is presented. Loading square bales from the side is easier as it presents a larger target for the operator however when loading square bales from the side the bale enters the processor with the longer length dimension thereof perpendicular to the feed rollers or flail drum causing the bale to land on top of the feed rollers. The feed rollers are configured such that a round bale rests on the feed rollers with the axis of the cylinder parallel to the feed rollers such that the arc of the cylinder extends down between the feed rollers to the guard rods and the flail elements on the disintegrator rotor extend up between the bars and contact the bale.

With a square bale with a substantially flat bottom resting across the feed rollers, the bottom of the bale is often above the reach of the flail elements, and the operator may need to try to bounce the bale processor over rough ground to break the bale, or actually cut the twines holding the bale together. Also square bales are packed with crop material from one end to the other such that the material is in wafers oriented perpendicular to the long dimension. Thus once the bale is opened up, the wafers of a square bale oriented with the long dimension perpendicular to the feed rollers are oriented perpendicular to the guard rods and thus resist falling down between the guard rods such that extended time is required to process the bale.

Thus it is preferred to load square bales from the end such that when transferred to the bale processing chamber, the long dimension is oriented parallel to the feed rollers and the disintegrator rotor where at least a corner of the bale can be contacted by the flail elements, and once the twine has been removed, the wafers of the bale can easily be processed as they are also parallel with the guard rods.

SUMMARY OF THE INVENTION

The present disclosure provides a bale loading apparatus for a bale processor that overcomes problems in the prior art.

In a first embodiment the present disclosure provides a bale processor apparatus comprising a bale processing chamber mounted on a chamber frame mounted on wheels for travel on a ground surface in a forward operating travel direction. A lift arm frame is pivotally attached to a rear end of the chamber frame about a substantially horizontal lift pivot axis oriented generally perpendicular to the operating travel direction, and a lift actuator is operative to selectively pivot the lift arm frame from a lowered position to a raised position. A bale turning assembly is pivotally attached to the lift arm frame and bale fork tines are attached to the bale turning assembly and configured to support a bale. A turning actuator is operative to pivot the bale turning assembly with respect to the lift arm frame from a standard position, where the bale fork tines are rearward of the bale processing chamber and extend rearward generally in alignment with the operating travel direction, to a turned position, where the bale fork tines are rearward of the bale processing chamber and extend generally perpendicular to the operating travel direction.

In a second embodiment the present disclosure provides a bale processor apparatus comprising a bale processing chamber mounted on a chamber frame mounted on wheels for travel on a ground surface in a forward operating travel direction. A lift assembly is pivotally attached to a rear end of the chamber frame about a substantially horizontal lift pivot axis oriented generally perpendicular to the operating travel direction, and a lift actuator is operative to selectively pivot the lift assembly from a lowered position to a raised position. Bale fork tines attached to the lift assembly extend rearward from the bale processing chamber and are configured, when the lift assembly is in the lowered position, to pick up from the ground surface and support a cylindrical bale, with a cylinder axis extending along a center of the cylindrical bale and twine wrapped around the outside of the cylindrical bale from one generally flat end thereof to an opposite generally flat end thereof and resting with the twine wrapped outside on the ground surface, wherein the bale fork tines are moved under the cylindrical bale generally in alignment with the cylinder axis with a first tine on a first side of the cylinder axis and a second tine on a second side of the cylinder axis opposite the first side, and also configured, when the lift assembly is in the lowered position, to pick up from the ground surface and support a rectangular bale, formed as an elongated cube with twine wrapped around an outer surface of the rectangular bale generally in alignment with a longitudinal axis of the rectangular bale and spaced across a width of the rectangular bale from a first side edge thereof to an opposite second side edge thereof and resting with a twine wrapped lower face thereof on the ground surface, wherein the bale fork tines are moved under the rectangular bale generally perpendicular to the longitudinal axis with the first tine on a first side of a mid-point of the longitudinal axis and the second tine on a second side of the mid-point of the longitudinal axis. A shear bar is attached to the lift assembly and extends from the lift assembly substantially parallel to the first and second bale tines and is configured such that, when the lift assembly is in the lowered position, the first tine is between the shear bar and the second tine, and the shear bar is above the first tine such that when the bale fork tines are moved under the rectangular bale, the shear bar passes into the bale above the twine wrapped lower face of the rectangular bale, and when the bale fork tines are moved under the cylindrical bale, the shear bar is outside the cylindrical bale.

In a third embodiment the present disclosure provides a method of loading bales into a bale processing chamber of a bale processor where the bale processing chamber is mounted on a chamber frame mounted on wheels for travel on a ground surface in a forward operating travel direction. The method comprises pivotally mounting a bale fork on the chamber frame such that in a lowered position the bale fork is oriented substantially horizontally and rests on the ground surface; moving the chamber frame rearward such that the bale fork slides under a bale resting on the ground surface with a bale axis oriented substantially horizontally in a first direction substantially perpendicular to the operating travel direction; raising the bale fork and the bale supported thereon above the ground surface; turning the bale fork such that the bale axis turns to a second direction substantially parallel to the operating travel direction while maintaining the bale rearward of the bale processing chamber, and raising the bale fork to a raised position where the bale falls into the bale processing chamber with the bale axis oriented in the second direction.

The present disclosure thus provides an apparatus and method that allows an operator to pick up a rectangular bale by maneuvering the bale fork toward the long side of the rectangular bale such that the accuracy of the maneuver is not as critical as it is when aiming the bale fork at the narrower end of the rectangular bale, and then once the bale fork is under the rectangular bale, same can be raised and rotated 90 degrees so the longitudinal axis of the rectangular bale is aligned with the disintegrator rotor when it falls into the bale processing chamber which is the preferred orientation for processing the rectangular bale.

A shear bar can also be provided to break the twine on the rectangular bale so that the twine wraps on the disintegrator rotor instead of being discharged with the shredded bale material. The wafers of baled material are also loosened immediately and are oriented parallel to the guard bars above the disintegrator rotor such that same fall readily between the guard bars and into the disintegrator rotor for processing The shear bar is configured such that when a cylindrical bale is picked up, the shear bar passes outside the cylindrical bale and the cylindrical bale is unaffected by the presence of the shear bar.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of an embodiment of a bale processor apparatus of the present disclosure with the bale turning assembly thereof in the closed position;

FIG. 2 is a schematic top view of the bale turning assembly of the embodiment of FIG. 1 in an intermediate position between the closed and open positions thereof;

FIG. 3 is a schematic top view of the bale turning assembly of the embodiment of FIG. 1 where the middle and rear frame sections are in the open position;

FIG. 4 is a schematic side view of the embodiment of FIG. 1 with the lift arm frame in the lowered position and the bale turning assembly in the closed position;

FIG. 5 is a schematic side view of the embodiment of FIG. 1 with the lift arm frame in a partially raised position and the bale turning assembly in the open position;

FIG. 6 is a schematic side view of the embodiment of FIG. 1 with the lift arm frame in the raised position and the bale turning assembly in the open position and with a rectangular bale about to fall from the bale fork tines into the bale processing chamber;

FIG. 7 is a schematic side view of the embodiment of FIG. 1 with the lift arm frame in the raised position and the bale turning assembly in the closed position and with a cylindrical bale about to fall from the bale fork tines into the bale processing chamber;

FIG. 8 is a schematic front view of the rear frame section of the bale turning assembly of the embodiment of FIG. 1, showing the configuration of the first and second bale fork tines and the shear bar;

DETAILED DESCRIPTION OF THE INVENTION

Figure 9:
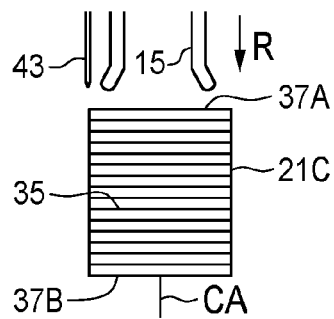
FIG. 9 is a schematic top view of the bale fork tines and shear bar moving rearward to pick a cylindrical bale off the ground.

FIGS. 1-7 schematically illustrate an embodiment of a bale processor apparatus 1 of the present disclosure comprising a bale processing chamber 3 mounted on a chamber frame 5 that is mounted on wheels 7 for travel on a ground surface in a forward operating travel direction T. A lift arm frame 9 is pivotally attached to a rear end of the chamber frame 5 about a substantially horizontal lift pivot axis LPA oriented generally perpendicular to the operating travel direction T, and a lift actuator 11 is operative to selectively pivot the lift arm frame 9 from a lowered position shown in FIG. 4 to a raised position shown in FIGS. 6 and 7.

A bale turning assembly 13 is pivotally attached to the lift arm frame 9 and bale fork tines 15 are attached to the bale turning assembly 13 and configured to support a bale as described further below.

A turning actuator 17 is operative to pivot the bale turning assembly 13 with respect to the lift arm frame 9 from a standard position shown in FIGS. 1 and 7, where the bale fork tines 15 are rearward of the bale processing chamber 3 and extend rearward generally in alignment with the operating travel direction T, to a turned position shown in FIGS. 3, 5, and 6, where the bale fork tines 15 are rearward of the bale processing chamber 3 and extend generally perpendicular to the operating travel direction T.

The bale turning assembly 13 is configured such that the bale fork tines 15 are substantially horizontal and in contact with the ground surface 19 with the lift arm frame 9 oriented generally vertically when the lift arm frame 9 is in the lowered position of FIG. 4, and such that when the lift arm frame 9 is in the raised position, and the bale turning assembly 13 is in either the standard position shown in FIG. 7 or the turned position shown in FIG. 6, a bale 21 supported on the bale fork tines 15 falls into the bale processing chamber 3.

In the illustrated apparatus 1, the bale turning assembly 13 comprises a middle frame section 23 pivotally attached at a first end 23A thereof to a first side 9A of the lift arm frame 9 about a middle pivot axis MPA such that the middle frame section 23 is pivotable from a closed position shown in FIG. 1 extending generally perpendicular to the operating travel direction T with a front face 23F of the middle frame section 23 adjacent to a rear face 9R of the lift arm frame 9, to an open position shown in FIG. 3 extending rearward from the first side of the lift arm frame 9.

A rear frame section 25 is pivotally attached to the middle frame section 23 such that the rear frame section 25 is pivotable from a closed position shown in FIG. 1 extending generally perpendicular to the operating travel direction T with a front face 25F of the rear frame section 25 adjacent to a rear face 23R of the middle frame section 23, to an open position shown in FIG. 3 extending rearward from a second end 23B of the middle frame section opposite the first end thereof.

The bale fork tines 15 are attached to the rear frame section 25 and extend rearward from the rear frame section 25 when the middle and rear frame sections 23, 25 are in the closed position shown in FIG. 1. The turning actuator 17 is operative to pivot the middle and rear frame sections 23, 25 between their respective open and closed positions.

A pivot bracket 27 extends forward from a middle portion of the front face 25F of the rear frame section 25, and a pivot pin 29 passes through the pivot bracket 27 and the second end 23B of the middle frame section 23 to pivotally attach the rear frame section 25 to the middle frame section 23 such that an outer end 31 of the rear frame section 25 extends beyond the second end 23B of the middle frame section 23 when the middle frame section 23 is in the closed position of FIG. 1.

The front face 31F of the outer end of the rear frame section 25 lies adjacent to the front face 23F of the middle frame section 23 when the middle and rear frame sections 23, 25 are in the open position shown in FIG. 3.

In the illustrated apparatus 1 the turning actuator 17 comprises an extendable middle actuator 17A operative to pivot the middle frame section 23 between the open and closed positions and an extendable rear actuator 17B operative to pivot the rear frame section 25 between the open and closed positions, and a turning actuator control 33, typically mounted at an operator's station, is operative to selectively extend and retract the middle and rear actuators. For time efficiency the turning actuator control 33 is typically operated to pivot the middle and rear frame sections 23, 25 toward the open position at the same time, and to pivot the middle and rear frame sections 23, 25 toward the closed position at the same time.

To avoid possible damage or malfunction when the bale fork tines 15 are turned while resting on the ground, lift actuator 11 and turning actuator 17 are configured such that the lift actuator pivots the lift arm frame 9 upward from the lowered position before the turning actuator pivots the bale turning assembly 13 from the standard position toward the turned position. Similarly the turning actuator 17 pivots the bale turning assembly 13 to the standard position before the lift actuator 11 pivots the lift arm frame 9 to the lowered position.

The bale fork tines 15 are configured, when the lift arm frame 9 is in the lowered position, to pick up from the ground surface and support both cylindrical bales 21C and rectangular bales 21R.

Figure 10:
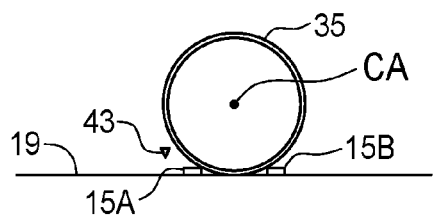
FIG. 10 is a front view of the bale fork tines and shear bar moved under the cylindrical bale of FIG. 9.

As schematically illustrated in FIGS. 9 and 10, typical cylindrical bales 21C have a cylinder axis CA extending along a center of the cylindrical bale 21C and twine 35 wrapped around the outer surface of the cylindrical bale 21C from one generally flat end 37A thereof to an opposite generally flat end 37B thereof. In the field such cylindrical bales 21C rest with the twine wrapped outer surface on the ground surface 19. To pick up the cylindrical bale 21C the bale fork tines 15 are moved rearward in direction R under the cylindrical bale 21C generally in alignment with the cylinder axis CA with a first tine 15A on a first side of the cylinder axis CA and a second tine 15B on a second side of the cylinder axis CA opposite the first side as shown in FIG. 10.

Figure 11:
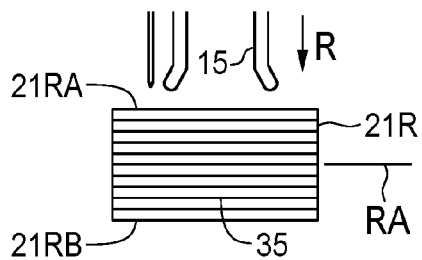
FIG. 11 is a schematic top view of the bale fork tines and shear bar moving rearward to pick a rectangular bale off the ground.
Figure 12:
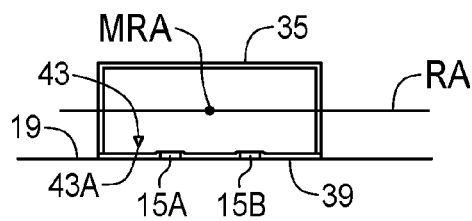
FIG. 12 is a front view of the bale fork tines moved under the rectangular bale of FIG. 11, and the shear bar pushed through the rectangular bale above the twine wrapped lower surface thereof.
Figure 13:
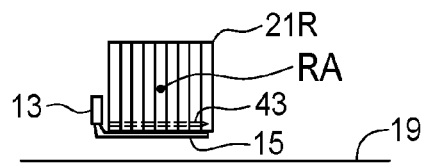
FIG. 13 is a front view of the rectangular bale supported on the bale fork tines in FIG. 12, and with the bale turning assembly in the turned position.

As schematically illustrated in FIGS. 11-13, a typical rectangular bale 21R is formed as an elongated cube with twine 35 wrapped around an outer surface of the rectangular bale 21R generally in alignment with a longitudinal axis RA of the rectangular bale 21R and spaced across a width of the rectangular bale 21R from a first side edge 21RA thereof to an opposite second side edge 21RB thereof and resting with a twine wrapped lower face 39 thereof on the ground surface 19. The bale fork tines 15 are moved under the rectangular bale 21R generally perpendicular to the longitudinal axis RA as shown in FIG. 11 with the first tine 15A on a first side of the mid-point MRA of the longitudinal axis RA and the second tine 15B on a second side of the mid-point MRA of the longitudinal axis RA.

Figure 14:
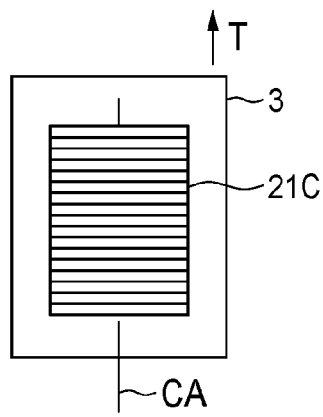
FIG. 14 is a schematic top view of a cylindrical bale that has been raised by the bale fork tines and fallen into the bale processing chamber.

The lift arm frame 9 is moved to the raised position with the bale turning assembly 13 in the standard position to move the cylindrical bale 21C from the ground surface into the bale processing chamber 3, as shown in FIG. 7, such that the cylinder axis CA remains substantially aligned with the operating travel direction T when the cylindrical bale 21C falls into the bale processing chamber 3 as shown in FIG. 14.

Figure 15:
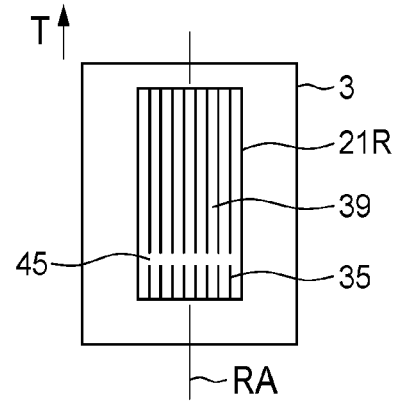
FIG. 15 is a schematic top view of a rectangular bale that has been raised by the bale fork tines and fallen into the bale processing chamber.

The lift arm frame 9 is moved to the raised position with the bale turning assembly 13 in the turned position to move the rectangular bale 21R from the ground surface into the bale processing chamber 3, as shown in FIG. 6, such that the longitudinal axis RA thereof is aligned with the operating travel direction T when the rectangular bale 21R falls into the bale processing chamber 3 as shown in FIG. 15.

It is known in the art that it is preferable to have twine removed from a bale 21 in the bale processing chamber in long lengths so that the twine wraps around the disintegrator rotor 41 instead of being ejected mixed with the shredded bale material. With the rectangular bale 21R oriented in the bale processing chamber as shown in FIG. 15, the disintegrator rotor 41 will rip off short pieces of twine which will be ejected.

To avoid this, the present apparatus 1 further comprises a shear bar 43 attached to the bale turning assembly 13 and extending from the bale turning assembly 13 and the lift arm frame 9 parallel to the first and second bale tines 15A, 15B and configured such that, when the lift arm frame 9 is in the lowered position, the first tine 15A is between the shear bar 43 and the second tine 15B, and the shear bar 43 is above the first tine 15A, generally as shown in FIG. 8. The arrangement is configured such that such that when the bale fork tines 15 are moved under the rectangular bale 21R as shown in FIG. 12, the shear bar 43 passes into the rectangular bale 21 above the twine wrapped lower face 39 of the rectangular bale 21R, and when the bale fork tines 15 are moved under the cylindrical bale 21C as shown in FIG. 10 the shear bar 43 is outside the cylindrical bale 21C and has no effect on the cylindrical bale 21C.

The shear bar 43 is configured to extend substantially all the way through the rectangular bale 21R from the first side edge 21RA thereof to the opposite second side edge 21RB thereof. The shear bar 43 has an edge 43A, which may be sharpened somewhat, oriented toward the ground surface 19 when the lift arm frame 9 is in the lowered position of FIG. 8. The twine on the twine wrapped lower face 39 of the rectangular bale 21R bears against the shear bar 43 when the lift arm frame is in the raised position shown in FIG. 6 and as the rectangular bale 21R falls into the bale processing chamber 3, the twine 35 is broken at the shear bar location 45 as shown in FIG. 15. The disintegrator rotor 41 then pulls the broken twine off the rectangular bale 21R in substantially full lengths, which wrap around the disintegrator rotor as desired.

In the orientation of the rectangular bale 21R shown in FIG. 15, with the twines 35 broken, the wafers of the packed rectangular bale 21R are loose and parallel to the guard rods 47 and readily pass through to the disintegrator rotor 41.

The present disclosure further provides a method of loading bales 21 into a bale processing chamber 3 of a bale processor where the bale processing chamber 3 is mounted on a chamber frame 5 mounted on wheels 7 for travel on a ground surface 19 in a forward operating travel direction T. The method comprises pivotally mounting a bale fork, schematically illustrated as bale fork tines 15, on the chamber frame 5 such that in a lowered position the bale fork 15 is oriented substantially horizontally and rests on the ground surface 19; moving the chamber frame 5 rearward such that the bale fork 15 slides under a bale 21R resting on the ground surface 19 with a bale axis RA oriented substantially horizontally in a first direction substantially perpendicular to the operating travel direction T; raising the bale fork 15 and the bale 21R supported thereon above the ground surface 19; turning the bale fork 15 such that the bale axis RA turns to a second direction substantially parallel to the operating travel direction T while maintaining the bale 21R rearward of the bale processing chamber 3; and raising the bale fork 15 to a raised position where the bale 21R falls into the bale processing chamber 3 with the bale axis RA oriented in the second direction substantially parallel to the operating travel direction.

The method further comprises pushing a shear bar 43 into the bale 21R above and in proximity to a lower twine wrapped surface 39 of the bale 21R as the chamber frame 5 moves rearward such that the bale fork 15 slides under the bale 21R, wherein the shear bar 43 is configured such that an edge 43A of the shear bar 43 bears against twines 35 wrapping the bale 21R as the bale 21R falls into the bale processing chamber 3.

The method further comprises configuring the shear bar 43 such that the shear bar 43 enters a rectangular bale 21R as the chamber frame 5 moves rearward to pick up a rectangular bale 21R, and such that the shear bar 43 moves rearward outside a cylindrical bale 21 as the chamber frame 5 moves rearward to pick up a cylindrical bale 21C.

The present disclosure thus provides an apparatus 1 and method that allows an operator to pick up a rectangular bale 21R by maneuvering the bale fork 15 toward the long side of the rectangular bale 21R such that the accuracy of the maneuver is not as critical as it is when aiming the bale fork 15 at the narrower end of the rectangular bale 21R. Once the bale fork 15 is under the rectangular bale 21R, same can be raised and then rotated 90 degrees so the longitudinal axis RA along the length of the rectangular bale 21R is aligned with the operating travel direction T and thus also aligned with the disintegrator rotor 41 which is the preferred orientation for processing the rectangular bale 21R.

A shear bar can also be provided to break the twine on the rectangular bale 21R so that the twine wraps on the disintegrator rotor 41 instead of being discharged with the shredded bale material. The shear bar can be configured such that when a cylindrical bale 21C is picked up, the shear bar passes outside the cylindrical bale 21C and the cylindrical bale 21C is unaffected by the presence of the shear bar 43.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A bale processor apparatus comprising:
 a bale processing chamber mounted on a chamber frame mounted on wheels for travel on a ground surface in a forward operating travel direction;
 a lift arm frame pivotally attached to a rear end of the chamber frame about a substantially horizontal lift pivot axis oriented generally perpendicular to the operating travel direction, and a lift actuator operative to selectively pivot the lift arm frame from a lowered position to a raised position;
 a bale turning assembly pivotally attached to the lift arm frame and bale fork tines attached to the bale turning assembly and configured to support a bale;
 a turning actuator operative to pivot the bale turning assembly with respect to the lift arm frame from a standard position, where the bale fork tines are rearward of the bale processing chamber and extend rearward generally in alignment with the operating travel direction, to a turned position, where the bale fork tines are rearward of the bale processing chamber and extend generally perpendicular to the operating travel direction;

wherein the bale turning assembly comprises:

a middle frame section pivotally attached at a first end thereof to a first side of the lift arm frame such that the middle frame section is pivotable from a closed position extending generally perpendicular to the operating travel direction with a front face of the middle frame section adjacent to a rear face of the lift arm frame, to an open position extending rearward from the first side of the lift arm frame;

a rear frame section pivotally attached to the middle frame section such that the rear frame section is pivotable from a closed position extending generally perpendicular to the operating travel direction with a front face of the rear frame section adjacent to a rear face of the middle frame section, to an open position extending rearward from a second end of the middle frame section opposite the first end thereof;

wherein the turning actuator is operative to pivot the middle and rear frame sections between their respective open and closed positions;

wherein the bale fork tines are attached to the rear frame section and extend rearward from the rear frame section when the middle and rear frame sections are in the closed position.

2. The apparatus of claim 1 wherein the bale turning assembly is configured such that the bale fork tines are substantially horizontal and in contact with the ground surface when the lift arm frame is in the lowered position, and such that when the lift arm frame is in the raised position, and the bale turning assembly is in the standard position or the turned position, a bale supported on the bale fork tines falls into the bale processing chamber.

3. The apparatus of claim 2 wherein the lift arm frame is oriented generally vertically when the lift arm frame is in the lowered position.

4. The apparatus of claim 1 configured such that the lift actuator is operative to pivot the lift arm frame upward from the lowered position before the turning actuator pivots the bale turning assembly from the standard position toward the turned position.

5. The apparatus of claim 4 further configured such that the turning actuator is operative to pivot the bale turning assembly to the standard position before the lift actuator pivots the lift arm frame to the lowered position.

6. The apparatus of claim 1 comprising a pivot bracket extending forward from a middle portion of the front face of the rear frame section, and a pivot pin passing through the pivot bracket and the second end of the middle frame section to pivotally attach the rear frame section to the middle frame section such that an outer end of the rear frame section extends beyond the second end of the middle frame section when the middle frame section is in the closed position.

7. The apparatus of claim 1 wherein the front face of the outer end of the rear frame section lies adjacent to the front face of the middle frame section when the middle and rear frame sections are in the open position.

8. The apparatus of claim 1 wherein the turning actuator comprises an extendable middle actuator operative to pivot the middle frame section between the open and closed positions and an extendable rear actuator operative to pivot the rear frame section between the open and closed positions, and a turning actuator control operative to selectively extend and retract the middle and rear actuators.

9. The apparatus of claim 8 wherein the turning actuator control is operative to pivot the middle and rear frame sections toward the open position at the same time, and is operative to pivot the middle and rear frame sections toward the closed position at the same time.

10. A bale processor apparatus comprising:

a bale processing chamber mounted on a chamber frame mounted on wheels for travel on a ground surface in a forward operating travel direction;

a lift arm frame pivotally attached to a rear end of the chamber frame about a substantially horizontal lift pivot axis oriented generally perpendicular to the operating travel direction, and a lift actuator operative to selectively pivot the lift arm frame from a lowered position to a raised position;

a bale turning assembly pivotally attached to the lift arm frame and bale fork tines attached to the bale turning assembly and configured to support a bale;

a turning actuator operative to pivot the bale turning assembly with respect to the lift arm frame from a standard position, where the bale fork tines are rearward of the bale processing chamber and extend rearward generally in alignment with the operating travel direction, to a turned position, where the bale fork tines are rearward of the bale processing chamber and extend generally perpendicular to the operating travel direction;

wherein the bale fork tines are configured, when the lift arm frame is in the lowered position, to pick up from the ground surface and support both:

a cylindrical bale, with a cylinder axis extending along a center of the cylindrical bale and twine wrapped around the outer surface of the cylindrical bale from one generally flat end thereof to an opposite generally flat end thereof and resting with the twine wrapped outer surface on the ground surface, wherein the bale fork tines are moved under the cylindrical bale generally in alignment with the cylinder axis with a first tine on a first side of the cylinder axis and a second tine on a second side of the cylinder axis opposite the first side; and a rectangular bale, formed as an elongated cube with twine wrapped around an outer surface of the rectangular bale generally in alignment with a longitudinal axis of the rectangular bale and spaced across a width of the rectangular bale from a first side edge thereof to an opposite second side edge thereof and resting with a twine wrapped lower face thereof on the ground surface, wherein the bale fork tines are moved under the rectangular bale generally perpendicular to the longitudinal axis with the first tine on a first side of a mid-point of the longitudinal axis and the second tine on a second side of the mid-point of the longitudinal axis;

and wherein the lift arm frame is moved to the raised position with the bale turning assembly in the standard position to move the cylindrical bale from the ground surface into the bale processing chamber such that the cylinder axis remains substantially aligned with the operating travel direction when the cylindrical bale falls into the bale processing chamber; and and wherein the lift arm frame is moved to the raised position with the bale turning assembly in the turned position to move the rectangular bale from the ground surface into the bale processing chamber such that the longitudinal axis thereof is aligned with the operating travel direction when the rectangular bale falls into the bale processing chamber.

11. The apparatus of claim 10 further comprising a shear bar attached to the bale turning assembly and extending from the bale turning assembly substantially parallel to the first and second bale tines and configured such that, when the lift arm frame is in the lowered position, the first tine is between the shear bar and the second tine, and the shear bar is above the first tine such that when the bale fork tines are moved under the rectangular bale, the shear bar passes into the rectangular bale above the twine wrapped lower face of the rectangular bale, and when the bale fork tines are moved under the cylindrical bale, the shear bar is outside the cylindrical bale.

12. The apparatus of claim 11 wherein the shear bar is configured to extend substantially through the rectangular bale from the first side edge thereof to the opposite second side edge thereof.

13. The apparatus of claim 12 wherein the shear bar has an edge oriented toward the ground surface when the lift arm frame is in the lowered position.

14. The apparatus of claim 13 wherein the twine on the twine wrapped lower face of the rectangular bale bears against the shear bar when the lift arm frame is in the raised position and as the rectangular bale falls into the bale processing chamber.

15. A bale processor apparatus comprising:
   a bale processing chamber mounted on a chamber frame mounted on wheels for travel on a ground surface in a forward operating travel direction;
   a lift assembly pivotally attached to a rear end of the chamber frame about a substantially horizontal lift pivot axis oriented generally perpendicular to the operating travel direction, and a lift actuator operative to selectively pivot the lift assembly from a lowered position to a raised position;
   bale fork tines attached to the lift assembly and extending rearward from the bale processing chamber and configured, when the lift assembly is in the lowered position, to pick up from the ground surface and support both:
      a cylindrical bale, with a cylinder axis extending along a center of the cylindrical bale and twine wrapped around the outside of the cylindrical bale from one generally flat end thereof to an opposite generally flat end thereof and resting with the twine wrapped outside on the ground surface, wherein the bale fork tines are moved under the cylindrical bale generally in alignment with the cylinder axis with a first tine on a first side of the cylinder axis and a second tine on a second side of the cylinder axis opposite the first side; and
      a rectangular bale, formed as an elongated cube with twine wrapped around an outer surface of the rectangular bale generally in alignment with a longitudinal axis of the rectangular bale and spaced across a width of the rectangular bale from a first side edge thereof to an opposite second side edge thereof and resting with a twine wrapped lower face thereof on the ground surface, wherein the bale fork tines are moved under the rectangular bale generally perpendicular to the longitudinal axis with the first tine on a first side of a mid-point of the longitudinal axis and the second tine on a second side of the mid-point of the longitudinal axis;
   a shear bar attached to the lift assembly and extending from the lift assembly substantially parallel to the first and second bale tines and configured such that, when the lift assembly is in the lowered position, the first tine is between the shear bar and the second tine, and the shear bar is above the first tine such that when the bale fork tines are moved under the rectangular bale, the shear bar passes into the bale above the twine wrapped lower face of the rectangular bale, and when the bale fork tines are moved under the cylindrical bale, the shear bar is outside the cylindrical bale.

16. The apparatus of claim 15 wherein the shear bar is configured to extend substantially through the rectangular bale from the first side edge thereof to the opposite second side edge thereof.

17. The apparatus of claim 16 wherein the shear bar has an edge oriented toward the ground surface when the lift arm frame is in the lowered position.

18. The apparatus of claim 17 wherein the twine on the twine wrapped lower face of the rectangular bale bears against the shear bar when the lift arm frame is in the raised position and as the rectangular bale falls into the bale processing chamber.

* * * * *

UNITED STATES PATENT AND TRADEMARK OFFICE
CERTIFICATE OF CORRECTION

Page 1 of 1

PATENT NO. : 10,028,440 B2
APPLICATION NO. : 15/147385
DATED : July 24, 2018
INVENTOR(S) : Blake Neudorf et al.

It is certified that error appears in the above-identified patent and that said Letters Patent is hereby corrected as shown below:

On the Title Page

In the Inventors, First Inventor; Blake Neudorf, Country of Residence currently lists "SK, or Slovakia", should be "CA, or Canada".

Signed and Sealed this
Eighteenth Day of September, 2018

Andrei Iancu
*Director of the United States Patent and Trademark Office*